United States Patent [19]
Carmien

[11] 3,830,125
[45] Aug. 20, 1974

[54] CUTTING ATTACHMENT FOR FIBERGLASS RODS

[75] Inventor: Joseph Allen Carmien, Sun Valley, Calif.

[73] Assignee: Nupla Corporation, Sun Valley, Calif.

[22] Filed: Mar. 15, 1973

[21] Appl. No.: 341,590

[52] U.S. Cl.................. 83/212, 83/176, 83/262
[51] Int. Cl............................................. B26d 5/28
[58] Field of Search ................. 83/212, 262, 176, 9

[56] References Cited
UNITED STATES PATENTS

| | | | |
|---|---|---|---|
| 2,452,856 | 11/1948 | Kerr | 83/212 X |
| 3,315,553 | 4/1967 | Handler et al. | 83/262 X |
| 3,344,718 | 10/1967 | Schollard | 83/9 X |

Primary Examiner—Willie G. Abercrombie

[57] ABSTRACT

A cutting attachment for cutting lengths of continuously formed fiberglass rods and other profiles. The cutting attachment has a stop member disposed in the path of each rod which is engaged by the end of the rod to operate a micro-switch. The micro-switch controls the operation of a clamping member which grips the rod and prevents further longitudinal movement. When the last micro-switch has been closed, a saw is moved transversely to cut all of the rods. The saw may simultaneously cut a notch in the end of each of the rods. Production continues while longitudinal movement is stopped with the rods flexing between the source of production and the clamping members. After the rods have been cut, the saw is retracted, the clamping members released and the rods straighten out automatically due to their own resilience.

4 Claims, 5 Drawing Figures

PATENTED AUG 20 1974　　　　　　　　　　　　　　　3,830,125
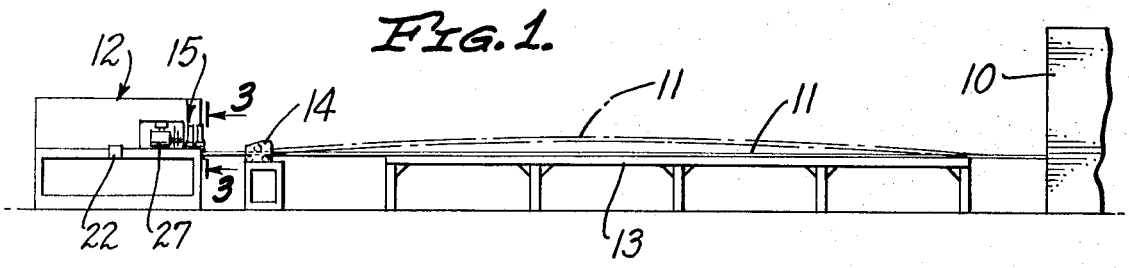
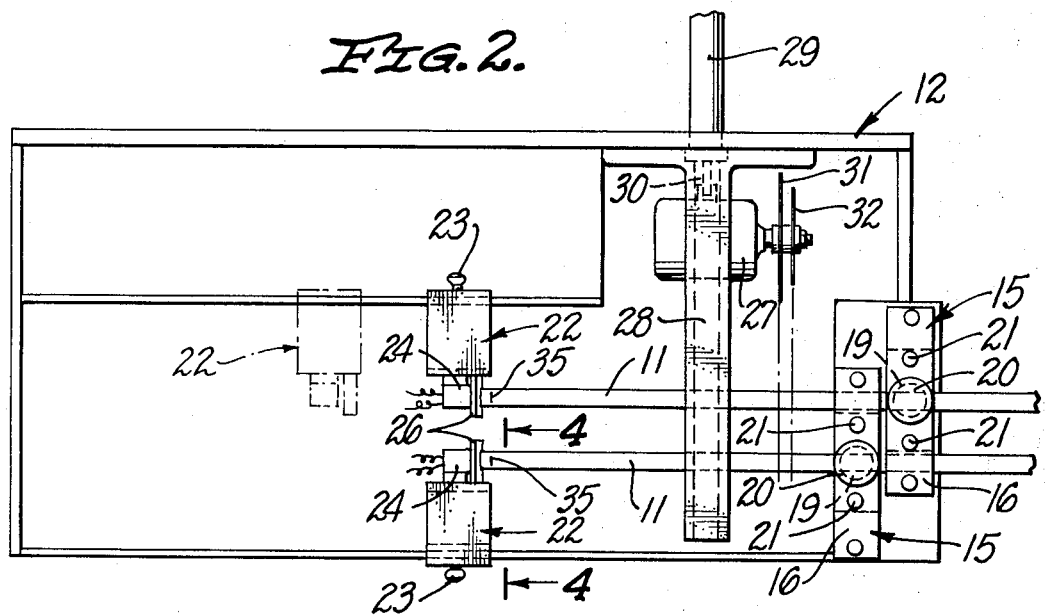
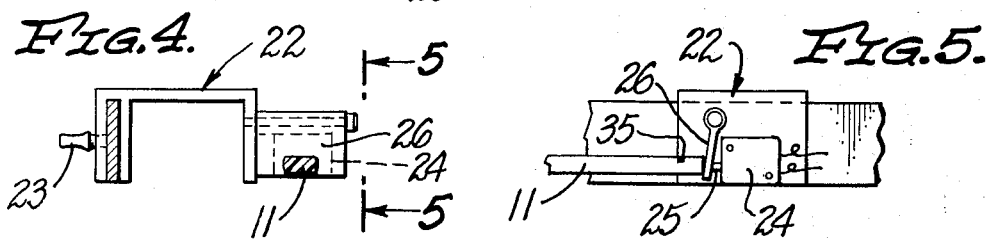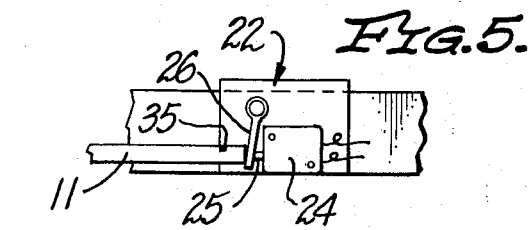
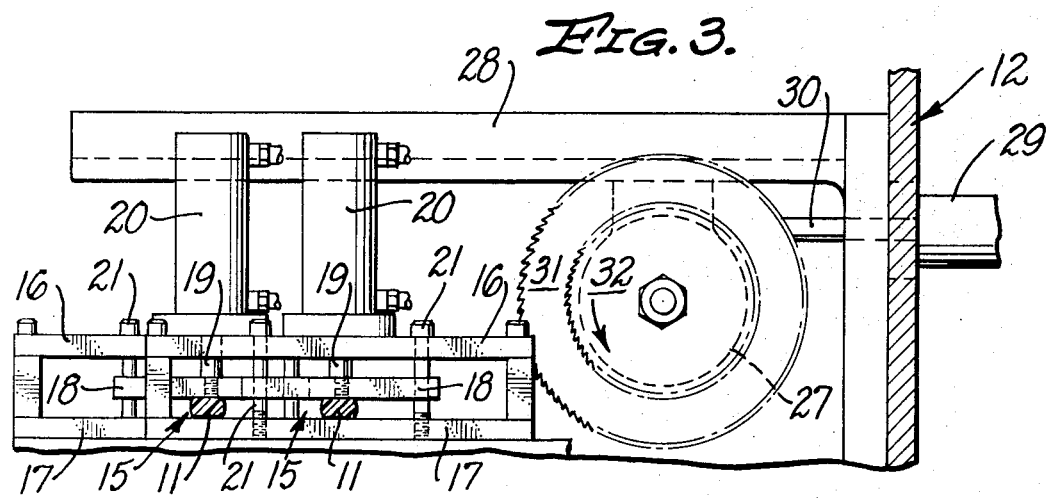

CUTTING ATTACHMENT FOR FIBERGLASS RODS

BACKGROUND OF THE INVENTION

1. Field of the Invention:

The invention relates to a cutting attachment for cutting lengths of continuously formed fiberglass rods and other profiles.

2. Description of the Prior Art:

In the manufacture of elongated fiberglass rods and other profiles, it is essential that the manufacturing process be continuous and uninterrupted. Any cessation of the manufacturing operation results in improper forming and curing of the stock.

At the present time, a cutting attachment is used which is mounted for longitudinal movement in the same direction and at the same speed as the travelling stock. Such an attachment is shown, for example, on page 43 of *Plastics World* magazine of March 1971.

A cutting attachment of this kind is relatively complex in its structure and operation. It is difficult to keep the cutter movement perfectly synchronized with the production of stock, which may vary in speed from time to time. It is also impossible to synchronize the cutter movement perfectly with multiple rods which may be formed simultaneously but move at somewhat different speeds.

SUMMARY OF THE INVENTION

The primary object of the present invention is to provide a cutting attachment for continuously formed elongated fiberglass rods and other profiles which attachment is stationary, but which is capable of cutting one or more rods without stopping or interfering in any way with the continuous production process.

It is particularly an object of the invention to provide such a cutting attachment in which the movement of each rod is stopped separately from the others as required by its particular rate of production and movement. After all of the rods have been stopped, they are held stationary while the cutting blade moves across and cuts all of the rods to the desired length. The cutting saw moves transversely to the rods, but the cutting attachment remains stationary and does not move in a longitudinal direction.

While the stock is held stationary adjacent to the cutting blade, the production process continues and the rods become slightly flexed or bowed between the cutting attachment and the production source but because of the extreme flexibility and perfect elasticity of fiberglass and its ability to return to its original configuration, this bowing or distortion of the stock is only temporary. When the rods are released, they immediately and automatically return to a straight configuration.

Another object of the invention is to provide a device of the type described which is adapted to cut one or more notches or other shapes in the stock at the same time that it is cut to length. The notches may be used to attach the rods to tool heads or for other attachment or sizing purposes. This eliminates the necessity of a second forming operation.

It is another object of the invention to provide a cutting attachment which is adapted to cut rods to different or identical precise lengths which are required in their ultimate use as tool handles, guy rods or other end products. This eliminates the necessity for further cutting and handling operations and a saving of material, since short end off-fall pieces are wasted if long lengths are cut to short in a second operation.

It is accordingly among the objects of the invention to provide a cutting attachment for fiberglass rods and other profiles having all of the advantages and benefits set forth above and described in detail hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view on a reduced scale of the cutting attachment of the present invention in use;

FIG. 2 is a top plan view of the cutting attachment alone;

FIG. 3 is a sectional view taken on line 3—3 of FIG. 1;

FIG. 4 is a rotated sectional view taken on line 4—4 of FIG. 2;

FIG. 5 is a side elevational view of a micro-switch assembly taken on line 5—5 of FIG. 4.

DESCRIPTION OF THE PREFERRED EMBODIMENT

A preferred embodiment which has been selected to illustrate the invention comprises a source of production of continuously formed elongated fiberglass rods or other profiles. This source of production may be of any type, such as the pultrusion process shown in U.S. Pat. Nos. 2,684,318 and 2,871,911. The source of production is well known to those skilled in the art and is accordingly shown only diagrammatically in FIG. 1 of the drawings and is designated by the reference numeral 10.

The source of production 10 is shown as simultaneously producing two rods 11. The attachment of the present invention can be used with any number of rods or other profiles from one to as many as are feasible to produce.

As indicated by FIG. 1 of the drawings, the cutting attachment 12 is preferably spaced away from the source of production 10 a sufficient distance to allow the rods 11 to flex during the cutting operation and not adversely affect the production operation. The rods 10 pass over a runout table 13 and then through a guide member 14 which includes a plurality of conventional guide rollers disposed in horizontal and/or vertical directions with the rods 11 passing between the rollers. The guide member 14 guides and controls movement of the rods 11 as they enter the cutting attachment 12.

Disposed adjacent the entrance end of the cutting attachment 12 are a pair of identically formed clamping members 15. Each of the clamping members 15 includes a stationary frame 16 having a bottom member 17 which is disposed beneath one of the rods 11. A clamping bar 18 extends transversely above the rod 11 and is attached to the lower end of a piston 19 which is reciprocally moved in a vertical direction by a hydraulic cylinder 20 which is mounted directly above the frame 16. The clamping bar 18 is slidably mounted on a pair of vertically directed guide posts 21 which prevent its lateral displacement.

A pair of identically formed micro-switch members 22 are mounted on the cutting attachment 12 and are movable longitudinally to any desired position in which they are held by an adjustable fastening member 23. FIG. 2 of the drawings shows in phantom lines an alternative position of one of the micro-switch members 22. It should be understood, however, that for longer lengths of rod the micro-switch members 22 need not necessarily be mounted on the cutting attachment 12 and they may be located any desired distance away from the clamping members 15.

Each of the micro-switch members 22 includes a micro-switch 24 having a normally outwardly urged operation projection 25 which is oriented in longitudinal alignment with one of the rods 11. A stop member 26 is disposed between the operating projection 25 and the rod 11 and is mounted for longitudinal pivotal movement along a horizontal axis which extends transversely to the rod 11. The stop member 26 is spring urged away from the projection 25 of micro-switch 24 so that it is normally out of engagement therewith.

A saw 27, which is preferably electrically operated, is suspended from and mounted for reciprocal movement along a support member 28 which extends transversely across the rods 11 between the clamping members 15 and the micro-switch members 22. The relative positions of the saw 27 and clamping bars 15 remain unchanged, regardless of the positioning of the micro-switch members 22. A hydraulic cylinder 29 has a piston 30 which is attached to the saw 27 and which moves the saw transversely across the rods 11.

In FIG. 2 of the drawings, the saw 27 is shown as having a cutting blade 31 and a notching blade 32 of smaller diameter which is located up stream from the cutting blade 31. Both blades are rotated simultaneously by the saw 27.

In operation, one or more rods 11 or other profile are produced by the source of production 10 in a continuous uninterrupted stream. The rods 11 move across the runout table 13 through the guide member 14 and through the clamping bars 18. The rods 11 pass freely beneath the clamping bars 18, which are normally disposed in an upward position. The rods 11 pass by the saw 27, which is normally disposed to one side of their path. The rods 11 continue on to the micro-switch members 22.

The micro-switch members 22 are disposed at any desired fixed distances from the path of the saw 27 so that the desired length of stock will be cut when the saw is activated.

When one of the rods strikes a stop member 26, the stop member 26 is pivoted to move the projection 25 of that micro-switch 24 inwardly to operate the micro-switch and close an electrical circuit controlling the flow of hydraulic fluid to one of the cylinders 20. This cylinder 20 acts to move its piston 19 downwardly, moving the clamping bar 18 downwardly into engagement with the top of the rod 11 so that the rod is firmly held between the clamping bar 18 and the stationary frame member 17. The rod 11 so gripped is held against further longitudinal movement, regardless of pressure exerted upon it from the source of production 10.

When the other rod 11 strikes its stop member 26, the same thing occurs and the second rod is then gripped and held in the same manner. If there are only two rods, as shown in the drawings, the closing of the second micro-switch 24 simultaneously closes the electrical circuit controlling the flow of hydraulic fluid to the cylinder 29 which controls movement of the saw 27.

The saw 27 is then moved transversely across both of the rods 11, cutting them to the precise lengths desired. At the same time the rods 11 are cut by the cutting blade 31, the notching blade 32 forms a notch 35 adjacent to the end of the uncut portion of the rod 11.

After the rods 11 have been cut, the cut portions drop or are removed and the stop members 26 automatically move outwardly, releasing the projections 25 of micro-switches 24 to open the formerly closed electric circuits. Opening of the electrical circuits operates the hydraulic cylinder in the reverse direction to retract the saw 27 and then release the clamping bars 18.

It will be noted that the cutting attachment of the present invention is designed to compensate automatically for varying rates of movement of the individual rods 11. These constantly vary during the manufacturing operation. It also makes it possible for different lengths of stock to be cut from each rod when production or feeding rates vary. The notching blade 32 may be operated to notch the stock at the same time it is cut or it may be eliminated if notching is not desired.

While the rods are being held for cutting, the length of stock between the cutting attachment and the means of production is permitted to bow or flex, generally upwardly, which deformation is only temporary and has no adverse affect on the finished product. As soon as the clamping bars holding the rods are released, the rods return automatically to a straight configuration. Longitudinal movement of the cutting attachment and its synchronization of the movement of the stock are eliminated to permit improved cutting operation and control.

The cutting attachment may also be used to cut previously formed stock or to cut longer lengths of stock into shorter ones.

I claim:

1. A cutting attachment for a plurality of parallel longitudinally moving fiberglass rods and other profiles comprising a separate clamping bar extending transversely to each of said rods, each of said clamping bars being mounted for independent reciprocal movement to engage one of said rods and prevent further longitudinal movement thereof, a piston connected to each of said clamping bars, a hydraulic cylinder operatively connected to each of said pistons, a stop member pivotally mounted in the path of each of said rods downstream from each of said clamping bars, a micro-switch mounted behind each of said stop members, resilient means normally holding said stop members out of engagement with said micro-switches, said stop members adapted to be independently pivoted by the ends of said rods to operate said micro-switches and close electrical circuits to engage said clamping bars, a saw mounted for reciprocal movement transversely to said rods to cut said said rods, a piston connected to said saw, a hydraulic cylinder operatively connected to said piston, the closing of all of said micro-switches controlling the operation of said hydraulic cylinder for cutting operation of said saw while all of said rods are held stationary against longitudinal movement by said clamping bars, the portions of said rods upstream from said clamping bars being temporarily deformed into a bowed configuration while said rods are held against longitudinal movement, said rods being adapted to straighten due to their own resilience upon release of said clamping members.

2. The structure described in claim 1, and means for operating said cylinder and piston in the reverse direction to retract said saw after all of said rods have been cut, and electrical means for holding all of said clamping bars closed to hold all of said rods stationary until after said saw has been retracted.

3. The structure described in claim 2, each of said stop members comprising a flap-like member mounted for pivotal movement along and depending downwardly from a horizontal axis extending transversely to one of said rods.

4. The structure described in claim 3, each of said clamping bars being disposed above one of said rods, each of said clamping bars being reciprocally movable in a vertical direction by a hydraulic cylinder disposed above said piston, each of said clamping bars being mounted on a pair of vertically directed guide posts which prevent lateral displacement.

* * * * *